(12) United States Patent
Griffin

(10) Patent No.: US 8,228,372 B2
(45) Date of Patent: Jul. 24, 2012

(54) DIGITAL VIDEO EDITING SYSTEM

(75) Inventor: Christopher Griffin, Reno, NV (US)

(73) Assignee: Agile Sports Technologies, Inc., Lincoln, NE (US)

( * ) Notice: Subject to any disclaimer, the term of this patent is extended or adjusted under 35 U.S.C. 154(b) by 1541 days.

(21) Appl. No.: 11/650,305

(22) Filed: Jan. 5, 2007

(65) Prior Publication Data

US 2007/0201815 A1   Aug. 30, 2007

Related U.S. Application Data

(60) Provisional application No. 60/756,939, filed on Jan. 6, 2006.

(51) Int. Cl.
*H04N 13/02* (2006.01)

(52) U.S. Cl. .............. 348/47; 348/43; 348/48; 348/511; 348/512

(58) Field of Classification Search ............... 348/14.01, 348/515, 47, 14.12, 43, 48, 511, 512, 516, 348/559
See application file for complete search history.

(56) References Cited

U.S. PATENT DOCUMENTS

2005/0042591 A1*  2/2005  Bloom et al. ............. 434/307 A
2006/0150100 A1*  7/2006  Braun et al. ................. 715/716
* cited by examiner

*Primary Examiner* — Barbara Burgess
(74) *Attorney, Agent, or Firm* — Advent IP, P.C., L.L.O.

(57) ABSTRACT

A digital video editing and playback system and methods of editing and playing back digital video are provided. The system includes a video processor adapted to receive video segments from multiple sources. The video segments include synchronization information. The video processor includes software instructions adapted to be executed by the video processor. The software instructions are adapted to evaluate the synchronization information from various video segments and to form associations between video segments from different sources that correspond to a common event.

8 Claims, 8 Drawing Sheets

DIGITAL VIDEO EDITING SYSTEM

PRIORITY CLAIM

This application claims the benefit of U.S. Provisional Patent Application No. 60/756,939 entitled SYSTEM AND METHODS FOR EDITING DIGITAL VIDEO filed on Jan. 6, 2006 which is incorporated herein by reference in its entirety.

BACKGROUND OF THE INVENTION

1. Technical Field

The Present invention relates to digital video editing systems and methods. The systems and methods of the invention are particularly well suited for editing and preparing sports training videos, football "game films" in particular.

2. Related Art

One area of athletics where video plays a very important role is the production of "game films." Today sporting events are typically recorded using digital video recorders. However, in keeping with standard usage, the present disclosure refers to video recordings of sporting events as "game films" even though there may be no film involved. Game films play an especially large role in preparing football teams to meet upcoming rivals. At almost all levels, little league, high school, college and professional, football teams routinely review films of their own previous performances too learn what they can improve on in their upcoming games. Teams also review films of their opponents in order to become acquainted with the other team's play calling tendencies, pass routes, defensive formations, and overall strengths and weaknesses.

The advent of digital video recorders has altered the concept of "game films" considerably. In the past, game films were literally movie films which were played essentially from beginning to end, perhaps with the ability to stop and reverse the tape and to selectively play portions of the film in slow motion. Editing such films required actually cutting the films and stitching them together at desired locations. This arduous process had the common effect of significantly limiting the amount of editing most coaching staffs were willing or able to do to produce more efficient training films. With digital video, however, editing video images from previous games is much simpler, and "game films" have become much more sophisticated.

Today game films typically include video from multiple sources capturing the action from multiple angles. For example teams will commonly use up to four video cameras to capture: 1) a wide angle view of the game from the press box, 2) a tight angle view, again from the press box perspective, 3) an end zone view; and 4) a reverse angle view from the opposite side of the field, a sideline view, or a view from some other angle. Each play may be recorded as an individual video file. After the game, or after receiving the video files from an opposing team's previous games, a coach or member of the coaching staff may assemble the various video files recorded during the course of a game as he sees fit, creating a customized video presentation of specific plays that the coach finds especially instructive. Furthermore, the coach may select different plays and different camera angles to create separate training videos for different position players. For example, a quarterback training video may concentrate on defensive pass plays from an opponent's previous games in order for the quarterback to become familiar with the opposing team's defensive formations and pass coverage schemes. Line coaches may prepare videos that include tight angle shots to more clearly show blocking techniques and assignments. Training videos may even include several versions of the same key plays recorded from multiple angles to glean as much information as possible from the opponent's past performances. The coach may even opt to include plays from a number of different games in the same video presentation. Coaches may also want to view plays that reflect key points in a game or series of downs. For example, coaches may want to view all third down plays, or only short yardage plays, and the like.

When multiple video capture devices are employed it becomes difficult to synchronize and align the video files from each source. As mentioned above, each play is typically recorded as a separate video file. When multiple cameras are used to record a game, each camera records the same events, but each from a different perspective. Because of their different perspectives, the video recorded by different cameras may appear significantly different when reviewed for editing purposes. Ideally, each camera recording a game will record a equal number of plays and the video files generated by each camera may be aligned or matches sequentially so that the first video file from each of the cameras will correspond to the first play of the game, the second video file from each camera will correspond to the second play, and so forth. In practice, however, this is rarely the case. Different camera operators may start and stop their cameras at different times. Occasionally a camera operator may forget to stop the camera at the end of a play so that a particular video file may include two consecutive plays rather than just one. Similarly, a camera operator may forget to turn on the camera so that one or more plays may be absent from video stream generated by one of the video sources.

In preparing sophisticated video game films it is important that the person assembling the films knows that he or she is looking at the same event from each of the different video sources when reviewing the captured video. Because the video from the different camera angles may appear significantly different for the same event, manually aligning the video files from each camera can be a difficult and time consuming task.

Another factor in the preparation and viewing of video game films is time. Coaches typically have limited time to spend with their players. Often it is more valuable for coaches to spend time drilling their players on the practice field rather than lecturing them in front of game films. Today's video technology allows coaches to prepare films that may be stored on portable media so that the players can review the films on their own time out of the presence of the coaching staff. Coaches may want to add commentary to such portable game films, and may wish to control the manner the individual video clips are played back. For example a coach may want to repeat a particular play several times, or replay the same play from several different angles, or play certain plays in slow motion, and the like. Heretofore coaches have not had the ability to synchronize a voice over layer with a sophisticated video stream including the types of playback features described above.

Finally, although sending game films home with the athletes on DVDs may be a more efficient way to get game films in front of players' eyes and for coaches to communicate important information to their players, some coaches nonetheless cannot pass up the opportunity to lecture players in person as they watch game films. Like the coaches preparing prerecorded training videos, live, stand-up coaches may also want to control the order and manner in which video files are played back. For example, as the coach is speaking the coach may want to have the ability to repeat a play several times, or replay the same play from several different angles, or play certain plays in slow motion, and the like. In order to accomplish this, the various video files must be accessed and played back in real time. The video files may be stored on a DVD or in a digital video database or some other medium. A computer may be used to access the video data and send the video to a display device such as a projector. An interface is needed to allow a coach or other user to quickly and easily access and control the playback of video files "on-the-fly" in order to control the display of video files in a live setting.

SUMMARY

The present invention relates to digital video editing and playback systems and methods of editing and playing back digital video. In particular the invention relates to systems and methods for editing and playing back digital video for athletic training purposes.

In an embodiment of the invention, a system for synchronizing video segments is provided. The system includes a video processor adapted to receive video segments from multiple sources. The video segments include synchronization information. The video processor includes software instructions adapted to be executed by the video processor. The software instructions are adapted to evaluate the synchronization information from various video segments and to form associations between video segments from different sources that correspond to a common event.

According to another embodiment of the invention, a computer readable medium is provided. The computer readable medium stores computer readable code for editing digital video. When executed by a computer the computer readable code is adapted to perform a number of digital video related functions. The first is to receive a first plurality of video segments from a first video source and a second plurality of video segments from a second video source. Each video segment includes a time identifier. Once the video segments have been received the computer readable code is adapted to evaluate the time identifier associated with a video segment from the first plurality of video segments with the time identifier associated with a video segment from the second plurality of video segments. The computer readable code then forms an association between the video segment from the first plurality of video segments and the video segment from the second plurality of video segments when the time identifier associated with the video segment from the first plurality of video segments corresponds with the time identifier associated with the video segment from the second plurality of video segments.

An embodiment further provides a system for creating a video and audio stream. The system includes a video storage device for receiving and storing a plurality of video segments. The video segments may be received from multiple sources. A controller for entering video playback commands is also provided, and a video playback device is provided for selectively playing video segments stored in the video storage device according to video playback commands entered in the controller. A voice recorder is provided to record audio to accompany the video playback. Finally, a video and audio assembler is provided for assembling a video stream and an accompanying voice overlay. The resulting video stream comprises video segments selectively played by the video playback device according to commands entered in the controller. The accompanying voice overlay comprises a voice signal recorded by the voice recorder as the video segments are selectively played according to the video playback commands entered in the controller.

In yet another embodiment, a system for playback of video data stored on a computer readable medium is provided. The system includes a computer adapted to read the video data stored on a computer readable medium. Playback instructions are stored on the computer for playback of the video data. A display is provided for displaying the video data during playback. An input device may be connected to the computer via a computer interface port. The input device accepts control commands for controlling the playback of the video data.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The present invention relates to a video editing system for creating finished video presentations or programs well-suited for athletic training purposes, as well as for controlling the playback of video recordings "on-the-fly" in a live setting. An embodiment of the video editing system is adapted to receive and store video data from a plurality of video capture devices. Preferably, each video capture device records the same event from a different perspective. A video editor may then preview the video segments recorded from the various video capture devices, and combine them in ways that best illustrate various aspects of the events recorded by the video capture devices. The combined video segments may be included in finished video presentations or programs produced for instructional purposes. An embodiment of the invention is especially well adapted for producing training videos or "game films" for assisting athletic teams prepare for upcoming contests.

Game films play an especially important role in preparing football teams to face their upcoming opponents. Accordingly, embodiments of a video editing system according to the present invention will be described in the context of preparing digitally edited football game films. However, it should be understood that the video editing system and the editing techniques described herein may be applied to other sporting events or to other events generally, to generate training films for substantially any subject desired.

Figure 1:
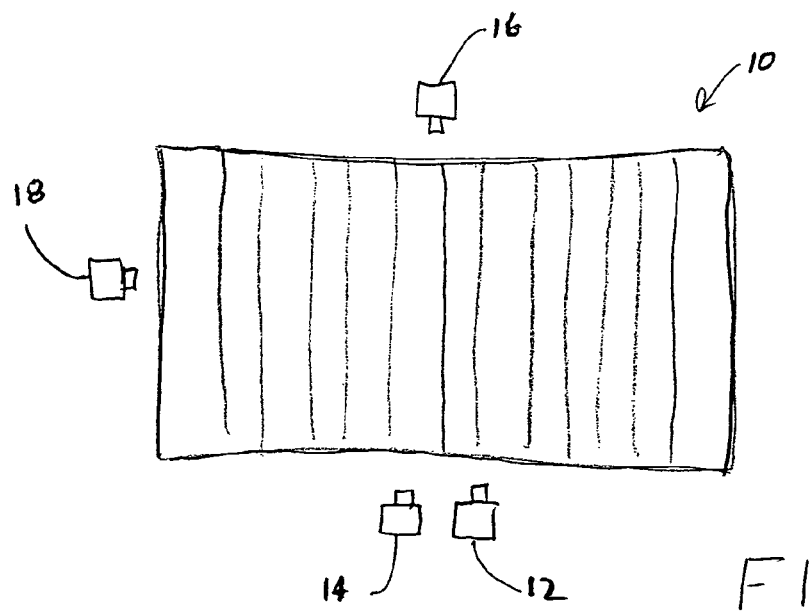
FIG. 1 is a diagram showing a typical arrangement of video cameras to recording a football game.

FIG. 1 illustrates a typical camera arrangement for video recording a football game. A plurality of video capture devices (digital video cameras), 12, 14, 16, 18, are located at various places around a playing field 10 to record the game from a plurality of different perspectives. For example, two cameras 12, 14 may be located above the field 10 in the stadium press box or at some other elevated a vantage point. The first camera 12 may be used to record wide angle views of the action on the field below. The other camera 14 may be used to record tight angle shots and close-ups of various position players in order to record activity that may not be apparent from the wide angle shots recorded by the first camera 12. A third camera 16 may be located on the opposite side of the field 10 to capture reverse angle shots of the play on the field 10. A fourth camera 18 may be placed at ground level at one end of the field or the other in order to capture shots from the end-zone. Of course, alternate camera positions may be employed depending on the preferences of the coaching staff and the availability of equipment. For example, more cameras or fewer cameras may be employed to record a game. An overhead camera may be employed to capture a bird's eye view of the field, and so forth.

Preferably, the events recorded by the video cameras 12 14, 16, 18 are recorded in short discrete video segments that are stored in separate video files. For example, in the context of video recording a football game, each play may be stored in a separate video file. Thus, the cameramen recording of the game may be instructed to start recording prior to the start of each play and stop recording at the conclusion of each play, and store the video segments corresponding to each play in a separate video file.

Figure 2:
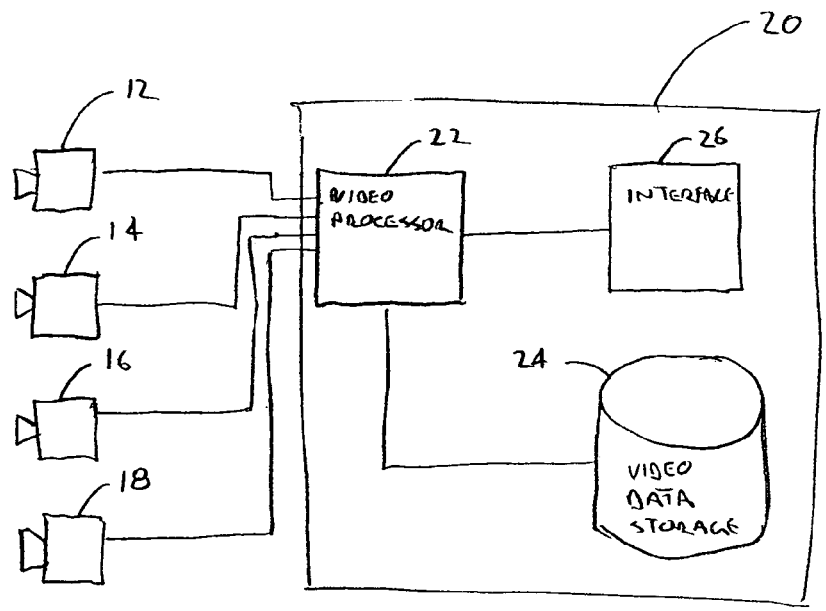
FIG. 2 is a block diagram of a video editing system.

FIG. 2 is a block diagram of a video editing system 20. The video editing system 20 includes a video processor 22, a large digital video data storage device 24 for storing both raw and edited digital video, and a user interface 26 allowing a user to interact with and control the video editing system 20. The video processor may include a memory for storing software instructions for carrying out the video editing functions described in the present disclosure, as well as a central processing unit or other logical device for performing the software instructions. The video processor 22 is adapted to receive raw unedited video streams from the various cameras 12, 14, 16, 18 used to record an event such as a football game. Preferably, the video streams received from the cameras are received in the form of a plurality of discrete digital video files. Preferably each digital video file contains a discrete video segment of the recorded the event, such as a video recording of an individual play executed during the football game.

The video processor 22 is adapted to store the received video streams in the video data storage devices 24. The storage device 24 may be an internal hard drive connected to the video processor 22 via an ATA interface, or some other mass storage device capable of storing large amounts of digital video data. For example, the storage device may be an external hard drive connected via USB, an external CD-RW device connected via USB, an internal CD-RW device connected via ATA or a flash memory device connected via USB.

The user interface 26 may comprise a graphical user interface including a display and one or more input devices such as a computer keyboard, a mouse, or microphone. The user interface 26 may be used to enter information identifying the various video streams for future reference, so that the various video streams, as well as the individual video files within them, may be quickly identified and retrieved in order to be included in a final edited video presentation. For example, each video stream may be identified by the name of the opponents playing in the recorded game, the date the video was recorded, and the viewing angle represented by the particular video stream. For example, the video stream received from camera 12 might be identified as "Wolverines v. Trojans Jan. 1, 2007 Wide Angle." The video received from the camera 14 might be identified as "Wolverines v. Trojans Jan. 1, 2007 Tight Angle." The video stream from camera 16 might be identified as "Wolverines v. Trojans Jan. 1, 2007 Reverse Angle." Finally, the video stream from camera 18 might be identified as "Wolverines v. Trojans Jan. 1, 2007 End Zone."

Additional information may be associated with the individual files comprising the various video streams received from the video cameras 12, 14, 16, 18 recording the event. Such additional data may be entered automatically by the video cameras 12, 14, 16, 18, by the video processor 22, or by a user via the user interface 26. For example, each video file within a received a video stream may have a sequence number appended to it, identifying the order in which the video segment was recorded within the corresponding video stream. Each file may also include a time stamp indicating the time at which the corresponding video segment was recorded. The time stamp may include a video start time and a video stop time corresponding to the time that the video camera began recording the video segment stored in the video file and the time the video camera stopped recording the video segment. The time stamp data may be added to the discrete video files by the video cameras themselves, according to each camera's internal clock. Later, a user may append additional information to the various files further identifying the video segments stored in each file. For example, for a video recording of a football game in which each play is stored in a separate video file, additional data appended to a file may include, additional data for each video file storing a video segment corresponding to a particular play might include information indicating which team had possession of the football during the play, the down and distance to go for a first down, the location of the line of scrimmage, and so forth. All such information stored with the various video files will help a video editor locate desired plays and retrieve and manipulate corresponding video clips for preparing customized video presentation or program.

Figure 3:
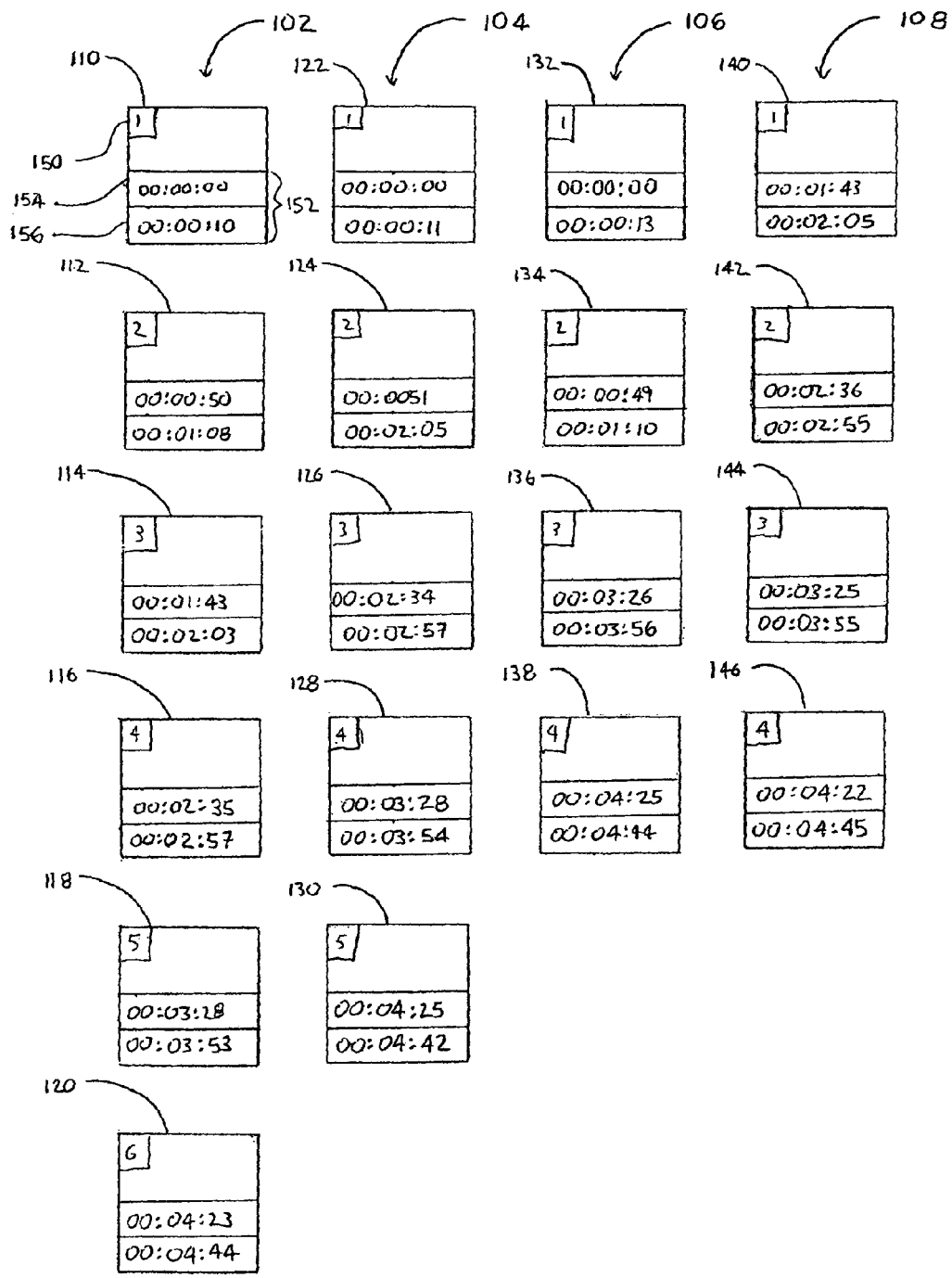
FIG. 3 is a block diagram showing a plurality of video files corresponding to a plurality of video streams recorded during a sequence of six consecutive plays executed during the course of a football game.

FIG. 3 is a block diagram representing four distinct video streams 102, 104, 106, 108 from a video recorded event such as a football game. The video streams 102, 104, 106, 108 may correspond to the separate video streams recorded by the video cameras 12, 14, 16, 18 shown in FIGS. 1 and 2. The video streams 102, 104, 106, 108 are divided into a plurality of separate video files, each video file storing a discrete video segment corresponding to a portion of the recorded event. In the context of a video recorded football game, each file preferably stores a video segment corresponding to a single play of the recorded game. Assume that the video streams 102, 104, 106, 108 correspond to a sequence of six consecutive plays recorded during a football game.

Ideally, when the cameramen are finished recording a game, the number of video files generated from each camera will be the same and will equal the total number of plays that were executed during the course of the game. In many cases, however, through human error, faulty equipment, or other technical difficulties, some plays may be missed. In other cases a cameraman may fail to stop recording between plays so that two or more plays may be recorded in a single video file. In such cases, the number of video files recorded from a particular video camera may not correspond to the number of video files recorded by the other cameras or to the number of plays that were executed during the game. This can cause a great deal of frustration when the coaching staff later tries to assemble the recorded video segments into a coherent presentation that may be used to prepare their players for their next game.

Consider the short sequence of six consecutive plays shown in FIG. 3. The first video stream 102 includes six video files 110, 112, 114, 116, 118, and 120. Since this equals the number of plays executed during the portion of the game represented in FIG. 3, we may assume that the cameraman responsible for recording the first video stream 102 was very attentive, starting and stopping the camera before and after each play and capturing each play in a separate video file. Thus, the first video file 110 corresponds to the first play of the six play sequence, the second video file 112 corresponds to the second play, and so forth through the sixth video file 120 which corresponds to the sixth play of the six play sequence.

The second video stream 104, however, includes only five video files 122, 124, 126, 128, and 130. In this case, the cameraman responsible for recording the second video stream 104 neglected to turn off the video camera at the conclusion of the second play, but remembered to stop recording at the end of the third. Thus, the second and third plays were recorded together in a single video file 124. Of the remaining video files in the second video stream 104, the first video file 122 corresponds to the first play of the six play sequence, the third video file 126 corresponds to the fourth play, the fourth video file 128 corresponds to the fifth play, and the fifth video file 130 corresponds to the sixth play.

The third video stream 106 contains only four video files 132, 134, 136, 138. In this case, the first video file 132 corresponds to the first play of the six play sequence, and the second video file 134 corresponds to the second play. However, in this case, the cameraman operating the video camera responsible for generating the third video stream 106 experienced technical difficulties and missed the third and fourth plays of the sequence of six plays represented in FIG. 3. The cameraman resolved whatever technical issues he had and resumed recording in time to capture the fifth and sixth plays. Since the third and fourth plays are absent, the third video file 136 actually corresponds to the fifth play of the six play sequence, and the fourth video file 138 corresponds to the sixth play.

Finally, the fourth video stream 108 also only includes four video files 140, 142, 144, and 146. In this case, the cameraman responsible for recording the game and generating the fourth video stream 108 may have been late setting up his camera, or had other difficulties at the start of the six play sequence. Whatever the cause, the fourth video stream 108 is missing video files corresponding to the first two plays of the sequence of six plays illustrated in FIG. 3. The first video file 140 in the fourth video stream 108 actually corresponds to the third play of the six play sequence. The second video file 142 corresponds to the fourth play, third video file 144 corresponds to the fifth play, and the fourth video file 146 corresponds to the sixth and final play of the six play sequence.

A sequence number 150 may be associated with each video file in the various video streams 102, 104, 106, 108. The sequence number 150 identifies the proper order of the various video files within each video stream 102, 104, 106, 108. The sequence numbers 150 provide a rough ordering of the various video files associated with the different video streams 102, 104, 106, 108, however, as is clear from a quick comparison of the sequence numbers of the video files from the different video streams shown in FIG. 3, the sequence numbers cannot be relied upon to ensure that the video segments stored in the video files from different video streams correspond to the same event or play. For example, as mentioned above, the second video file 112 in the first video stream 102 corresponds to the second play of the six play sequence illustrated in FIG. 3. Being the second video file in the first video stream 102, the second video file 112 has a sequence number of 2. The second video file 142 from the fourth video stream 108 also has the sequence number 2. However, the second video file 142 of the fourth video stream 108 stores a video segment corresponding to the fourth play of the six play sequence. Clearly, sequence numbers alone may not be relied upon to identify video files from different video streams that store video segments recording the same event or play. Something more than mere sequence must be employed to properly align the video files from the various video streams and match the video segments from different video streams recording the same event or play.

According to an embodiment of a video editing system, video files from different video streams may be automatically aligned based on the time at which the video segments stored in the various video files were recorded. In addition to the sequence number 150, each video file may also include a time stamp 152 indicating the time at which the video segment stored in the video file was recorded. Each time stamp 152 may include a video start time 154 and a video stop time 156. It may be assumed that video segments from the different video streams 102, 104, 106, 108 having overlapping time stamps, indicating that the were recorded at substantially the same time, are recordings of the same event or play. Thus, time stamp information may be used to identify video files from different video streams storing video segments recoding the same event or play. Once video files containing common video segments have been identified, they may be aligned or grouped together, so that a video editor may select a particular video segment from one of the video streams that best illustrates an aspect of the play that the video editor wishes to highlight.

Before the time stamps can be used to align the various video segments, however, the time stamp data must be synchronized across the various video streams. The time stamps associated with each of the video files in the various video streams may be generated by internal clocks associated with the digital video cameras responsible for recording the various video streams. Preferably the internal clocks of all the video cameras used to record a sporting event such as a football game will be synchronized prior to the game, so that all of the cameras recording the event will time stamp video files recorded at substantially the same time with substantially the same time stamp values. So long as the internal clocks of the various video cameras remain in sync, the time stamps associated with each video file from each video stream 102, 104, 106, and 108 may be relied upon to match the video segments stored within each video file from the different video streams 102, 104, 106, 108.

Figure 4:
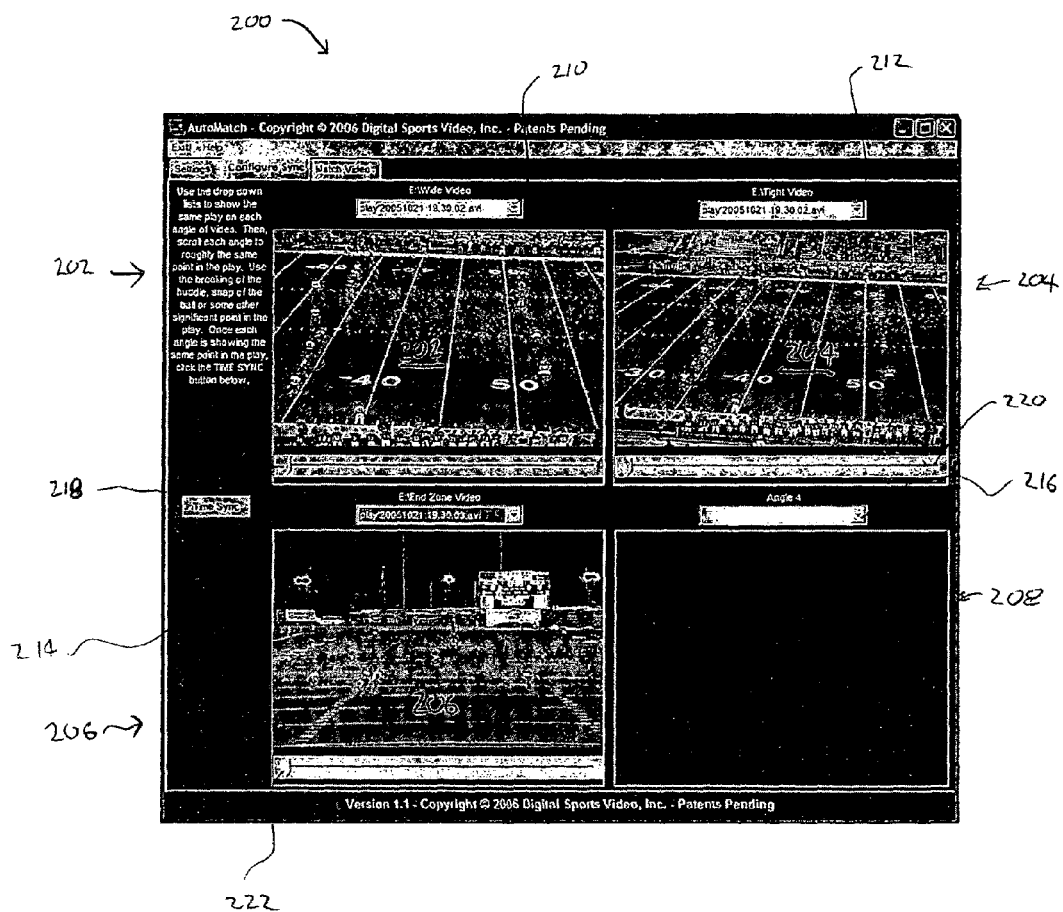
FIG. 4 is a screen shot of a graphical user interface page for synchronizing time stamp values associated with a plurality of individually recorded video streams.

If the internal clocks within the cameras were not synchronized before recording the game, the time stamps associated with the various video files may need to be adjusted or synchronized before the time stamps can be relied upon to properly align the video segments stored within the video files from the various video streams 102, 104, 106, 108. The time stamps may be synchronized by previewing video segments stored in video files from the different video streams and visually identifying video segments corresponding to the same event or play. FIG. 4 shows an interface page 200 that may be used to synchronize the time stamp values associated with video segments from a plurality of video streams. The interface page 200 includes a plurality of preview windows 202, 204, 206, 208. Each preview window may be used to open the video files and view video segments from the different video streams from a recorded event. Each preview window 202, 204, 206, 208 includes a drop down menu 210, 212, 214, 216 for selecting individual video segments to be displayed within each preview window. Once a video stream has been assigned to a preview window, the individual video files from the selected video stream will appear in the drop down menu. A video segment stored in a particular file may be selected from the drop down menu. The selected video segment will appear in the corresponding preview window. In this case, video segments of the first play of the six play sequence illustrated in FIG. 3 from the first three video streams 102, 104, 100 are shown in the preview windows 202, 204, 206. No video segment is shown in preview window 208 since the fourth video stream 108 did not include a video file corresponding to the first play. Each preview window 202, 204, 206 displaying a video segment further includes a scroll bar 216, 220, 222 that may be used to move through the video segment displayed in the corresponding preview window in order to scroll through or the video segment in order to advance or reverse segment to a particular point readily identified point in time to display a desired portion of the video segment.

The time stamp data for the video files from different video streams may be synchronized by previewing video segments from each video stream and identifying video segments that are recordings of the same event or play. With video segments known to corresponds to the same event or play displayed in each preview window 202, 204, 206, 208, each video segment may be advanced to a clearly defined event that occurs in each video segment and that may be readily identified in each preview window. For example, if the recorded event is the opening kickoff of a football game, each video segment may be advanced to the point when the kicker's foot strikes the ball. When all of the video segments capturing this event are advanced to the same point, each corresponding video stream may be synchronized to a common reference time frame. The original time stamp values from the video files from each video stream may be adjusted to the reference time frame based on the synchronized segments displayed in the preview Windows 202, 204, 206, and 208. For example, a time stamp correction factor may be determined for each video stream. The time stamp correction factor for a particular video stream may be determined by the amount of time that an original time stamp value for a video segment displayed in a preview window must be adjusted in order to correspond to the synchronized reference time frame. All of the time stamp values for the remaining video files within the same video stream may then be adjusted by a like amount.

Once the time stamp values for all of the video files and all of the video streams have been synchronized, overlapping time stamp values may be used to align or match the various video segments stored within the video files associated with each of the video streams 102, 104, 106, 108. Assuming that the time stamp values associated with the video files shown in FIG. 3 have been synchronized, it is a fairly simple matter to determine that the first video files 120, 122, and 132 in the first three video streams 102, 104, and 106 having video start/stop time stamp values of 00:00:00/00:00:10; 00:00:00/00:00:09; and 00:00:010/00:00:13 respectively, correspond to the same play. It is a similarly simple matter to determine that the video segments stored in the second video files 112, 134 of the first and third video streams 102, 106 having video start/stop time stamp values of 00:00:50/00:01:08; and 00:00:49/00:01:10 each correspond to the second play. It is less clear, however, whether the second video file 124 in the second video stream 104 corresponds to the same play as the second files 112, 134 of the first and second video streams 102, 106, since the video stop time stamp associated with the second video file 124 of the second video stream 104, 00:02:05, is significantly different from the video stop time stamps associated with the video files 112 and 134 from the first and third video streams 102, 106.

Figure 5:
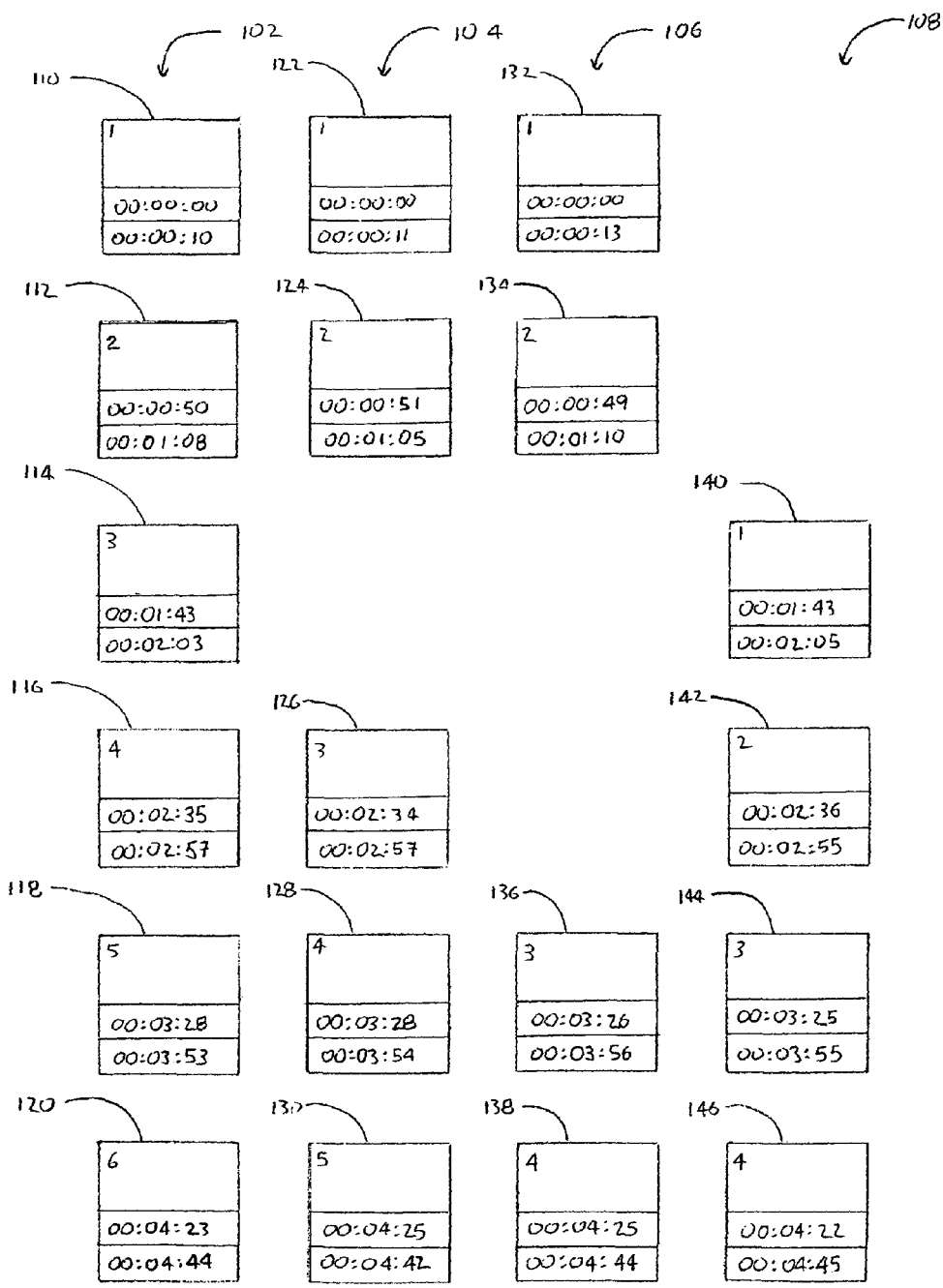
FIG. 5 is a block diagram showing the same plurality of video files as shown in FIG. 3 after an auto matching, or video segment aligning function has been performed.

According to an embodiment of the invention, the video processor 22 (see FIG. 2) may be instructed automatically align or match the video files from the different video streams based on the time stamp values associated with each video file. The results of aligning the video files corresponding to the sequence of six plays represented in FIG. 3 are shown in FIG. 5. As one would expect, the first video stream 102, which included video files corresponding to all six plays, includes six video files in sequence, with no gaps or spaces corresponding to missing video files. The second video stream 104, however, includes a gap corresponding to the third play of the six play sequence. Recall that the second and third plays were inadvertently recorded in a single video file 124 in the second video stream 104. There is no separate file storing a video segment corresponding the to the third play. The third video file 126 of the second video stream 104 actually corresponds to the fourth play of the six play sequence and is shown aligned with the fourth video file 116 of the first video stream 102 which also corresponds to the fourth play of the six play sequence. The correspondence between the fourth video file 116 of the first video stream 102 and the third video file 126 of the second video stream is apparent when one compares their time stamp values. The fourth video file 116 of the first video stream 102 has video start/stop times of 00:02:35/00:02:57. The third video file 126 of the second video stream has video start/stop times of 00:02:34/00:02:57. Clearly the video segments within each of these files were recorded at substantially the same time.

A similar time stamps analysis confirms that the third video file 136 of the third video stream 106 actually corresponds to the fifth video file 118 of the first video stream 102, the fourth video file 128 of the second the video stream 104 and the third video file 144 of the fourth video stream 108. Each of these files 118, 128, 136, 144 corresponds to the fifth play of the six play sequence. The fact that the third video file of the third video stream 106 actually corresponds to the fifth play of the six play sequence results in a gap in the third video stream 106 corresponding to the third and fourth plays of the six play sequence for which video files are missing. A similar gap appears in the fourth video stream 108 in which video files corresponding to the first and second plays of the six play sequence are absent. The time stamp values for the first video file 140 of the fourth video stream 108, 00:01:43/00:02:05, indicate that the first video file 140 of the fourth video stream 108 corresponds to the third video file 114 of the first video stream 102. As has been described, both files 114, 140 correspond to the third play of the six play sequence.

Figure 6:
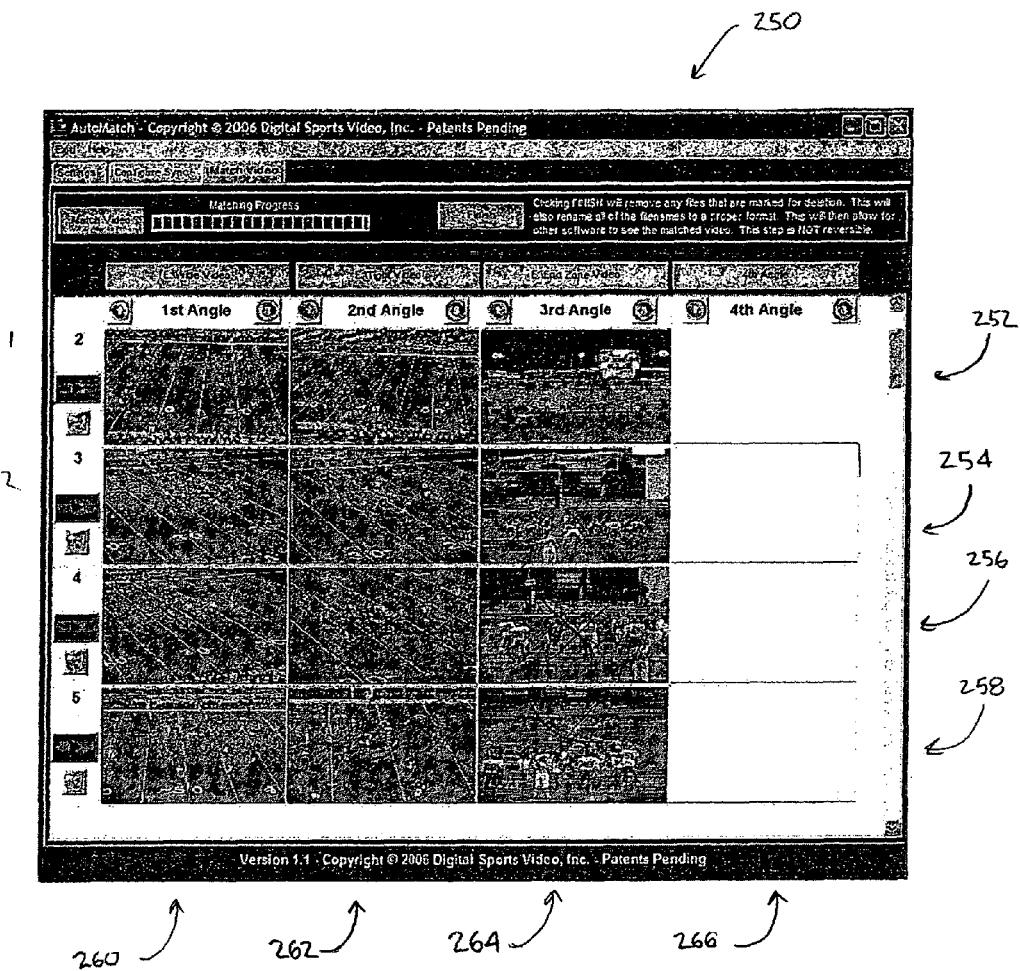
FIG. 6 is a screen shot of a graphical user interface page displaying matched, or aligned video segments of the same event recorded from different perspectives.

Once the video files have been aligned as shown in FIG. 5, the video segments corresponding to the same play or event may be grouped together and displayed by the user interface 26 (see FIG. 2). FIG. 6 shows an interface page 250 for displaying groups of aligned or matched video segments. Each row 252, 254, 256, 258 represents a distinct event or play. Each column 260, 262, 264, 266 corresponds to one of the video streams 102, 104, 106, 108. Thus, each row displays one or more video segments of a particular event or play as recorded from the various perspectives corresponding to each video stream 102, 104, 106, and 108. The interface page 250 may allow a video editor to visually confirm that the various video segments have been aligned or matched correctly. Furthermore, a video editor may manually align video segments by dragging video segments from one location on the interface page 250 and dropping them into another, or performing a cut and paste operation to move the segment to another spot within the same video stream, or even moving a video segment into a different video stream if necessary to correct any alignment errors that may have resulted from the automatic alignment of the video segments based on the time stamp values alone. Furthermore, a video editor may determine that a particular video file actually contains two consecutive plays, as is the case in the second video file 124 of the second video stream 104. The video editor may preview such a file using the interface page 250. The video editor may divide the video segment stored in such a file at an appropriate point between the two plays to create two separate video segments that may be stored in separate video files. The video editor may then place each video file in the appropriate row and column of the interface page 250 corresponding to the particular play and camera angle represented in each file.

Once the video files from the various video streams have been aligned or matched, the video editor may save the results such that an association is created between the video files from the different video streams relating to the same event or play. Later, when a video editor requests the video segments for a particular event or play, all of the video segments available from the various video streams will be returned and the video editor may select whichever segment best fits his requirements.

Figure 7:
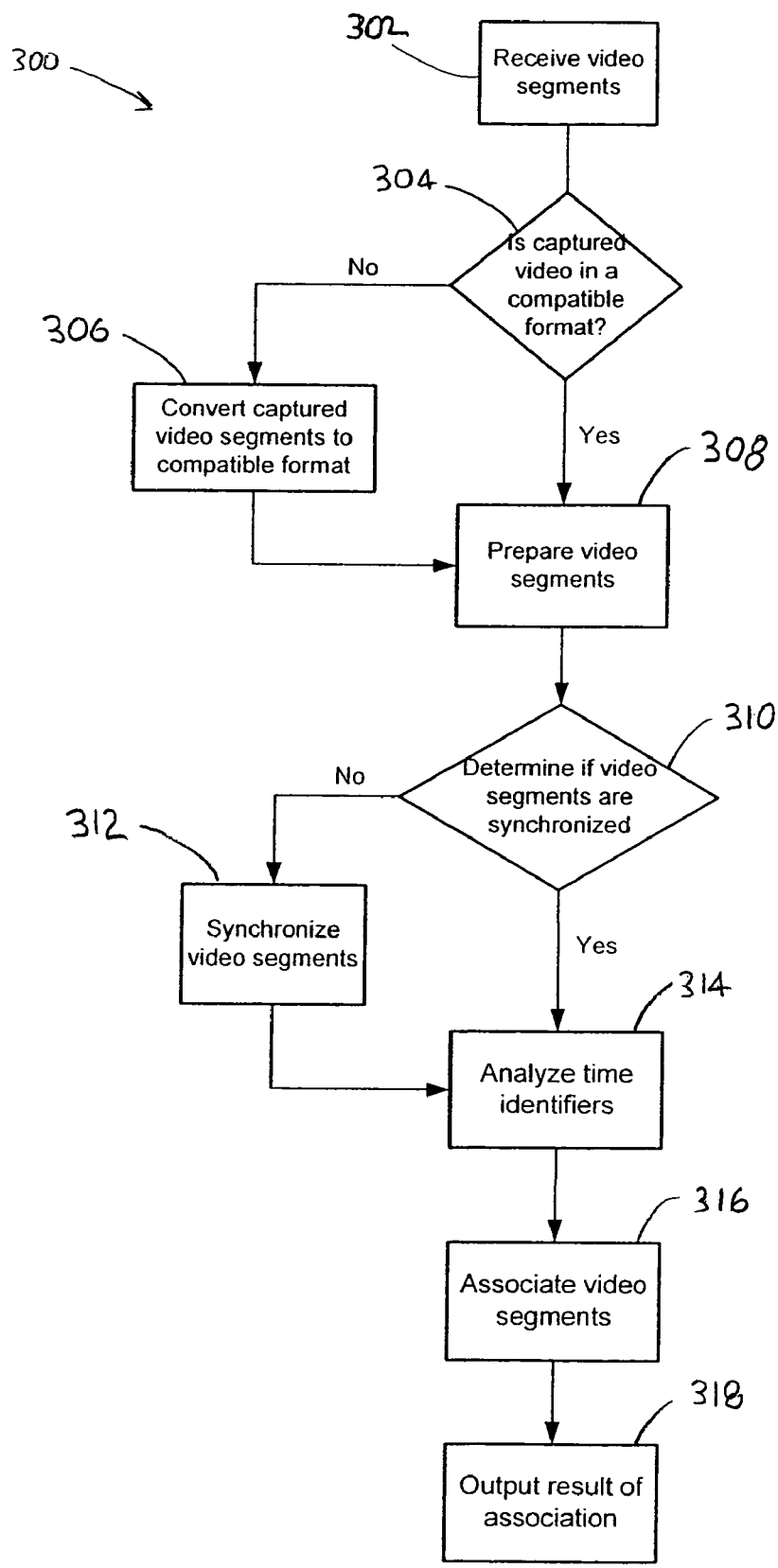
FIG. 7 is a flowchart illustrating an auto match, or video segment alignment function.

FIG. 7 shows a flow chart 300 of a method for automatically aligning independently recorded video segments of a common event according to an embodiment of the invention. A first step 302 is to receive the captured video segments from a plurality of video capture devices. Once the video segments have been received from the video capture device or devices, a determination is made at step 304 whether the captured video is in a format compatible with the video editing system. If the captured video segments are not compatible with the video editing system, they must be converted into a compatible format at step 306. Once the segments are converted, or if they were in a compatible format from the start, the segments are prepared for alignment by selecting the appropriate videos streams that are to be aligned at step 308. Next, at step 310, a determination is made whether the prepared segments have already been synchronized. If not, they are synchronized at step 312. If the video streams had been previously synchronized, or after they are synchronized at step 312, the process moves to step 314 where the time stamp values associated with individual video files from the various video streams being aligned are analyzed. Video segments that are deemed to represent the same event based on the analysis of their time stamp values are associated with one another at step 316. The results of the associations are output at step 318 to provide aligned video streams from a plurality of video sources.

Another aspect of the invention relates to a digital video editing system adapted to create a custom video presentation or program including one or more video segments and a synchronized audio overlay. The customized video presentation may be played back for a viewing audience at a later time in a sequence and manner determined by a video editor (typically a coach or other member of a team's coaching staff). The system allows the video editor to enter playback commands that will control the sequence and manner that the various video segments will be played back during the custom presentation, and synchronizes the audio overlay with the video presentation.

The user interface 26 may include provisions for allowing a video editor to preview video segments stored in the video data storage device 24, and selecting video segments to be included in a custom video presentation being assembled by the video editor. The video editing system may further comprise a playback controller for entering video playback commands for controlling the manner in which the selected video segments are displayed in the preview window. The video playback commands may include commands such as "play," "stop," "rewind", "fast-forward," "skip to beginning", "skip to end", "slow motion forward", "slow-motion reverse", and "pause". Video playback commands entered via the playback controller may be stored along with the video data comprising the custom video program such that when the custom video segments comprising the custom program will be played back in a manner consistent with the saved commands.

In addition to the controller for entering video payback commands, the video editing system may also include a voice recorder for recording the audio overlay. Alternatively the video editing system may include provisions for receiving pre-recorded audio input from some other source. Thus, the audio overlay may include a coach's commentary recorded as the custom video program is created, background music selected from some other audio source, or audio from some other locally accessible audio file.

Using the voice recorder a coach or other video editor may record an audio stream while reviewing the video segments selected for inclusion in the custom video program. The audio overlay may be recorded as the editor enters the playback commands for controlling the manner in which the video segments will be played back when the custom video program is presented to a viewing audience. Thus, the coach's commentary may be synchronized with the playback commands from the start. The audio overlay will be saved along with the playback commands the coach entered while adding his commentary. Accordingly the audio overlay will correspond to and be synchronized with the video when it is later played back for a viewing audience.

The video editing system may further include a video and audio assembler for assembling the video stream, the playback commands and the audio overlay into the final custom video presentation that may be saved as a unit in the video storage device 24, on a DVD, CD ROM, or other storage medium.

Figure 8:
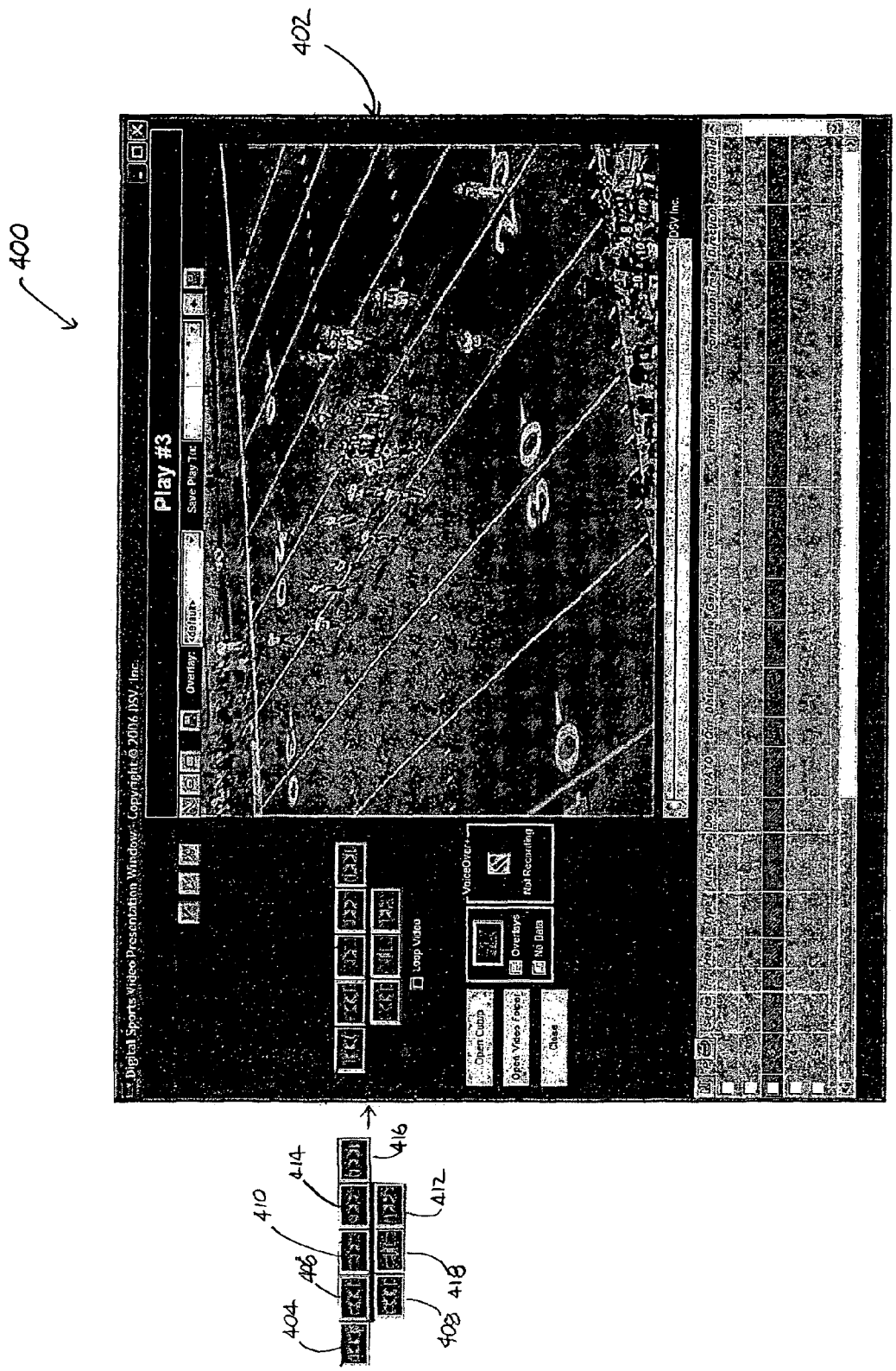
FIG. 8 is screen shot of a graphical user interface page for previewing video segments and adding playback controls and an audio over lay to a customized video presentation or program.

For example FIG. 8 shows a graphical interface page 400 that may be used to assemble a custom video program including playback control commands and a voice overlay. A video editor, coach or other team personnel may select a video segment to be included in a custom video program. The video segments selected by the video editor, coach, or other personnel are displayed in a preview window 402. The interface further includes a plurality of playback control buttons, including "play" 410, pause 418 "rewind" 406 fast forward 414 "slow motion reverse" 408 slow motion forward 412 "skip to beginning" 404, "skip to end" 416. Alternatively such control functions may be provided via a remote hand held device. A microphone input may also be provided for receiving the voice audio overlay. The coach may use the various playback controls to control the video displayed in the preview window as the various video segments are played back in the preview window 402. At the same time the coach may enter his audio commentary by speaking into the microphone. As the various video segments are played back in the preview window 402, both the audio commentary and the playback commands entered by the coach may be assembled into the final custom video presentation and stored for later playback in front of a desired viewing audience as described above.

According to another aspect of the invention, the video system 20 provides for the playback of video data stored on a computer readable medium in response to playback commands received as the video data is presented. Often a football coach reviewing digital video recording of a game with his players will be equipped with a laptop computer capable of reading digital video data from a computer readable medium such as a computer hard drive, a DVD, or other media. The computer may be equipped with video software for presenting digital video on a display device such as an LCD screen a video projector or the like. The computer may include a user interface allowing a user to interact with the video presentation software for controlling the playback of the digital video.

Figure 9:
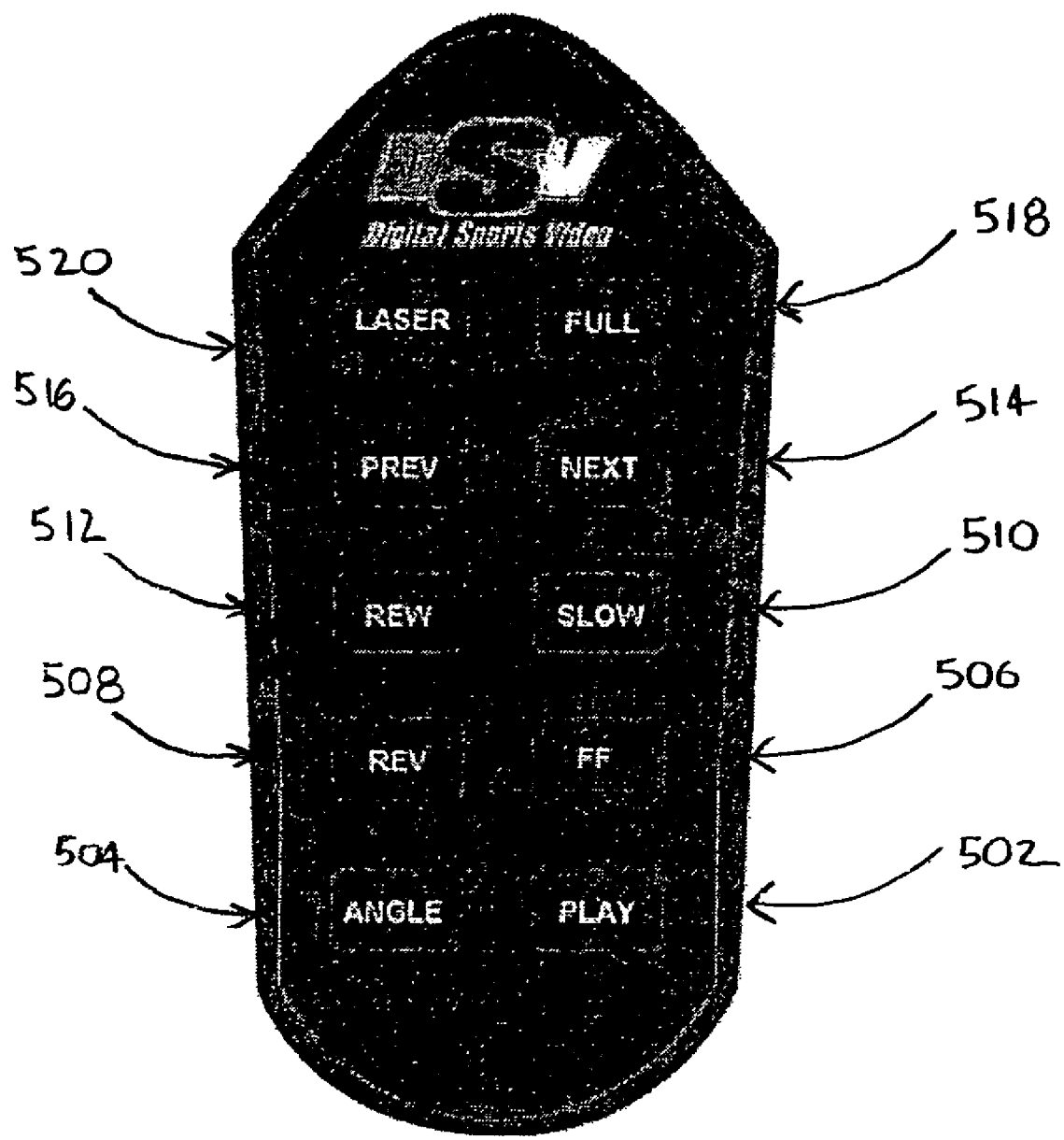
FIG. 9 is an illustration of a remote control device for controlling video playback during the course of a live presentation of a video recorded event.

The interface may comprise a graphical user interface that includes playback control buttons such as the playback control buttons associated with the preview window on the interface page 400 shown in FIG. 8. Preferably, however, the playback control buttons may be included in a handheld wireless remote control device. An example of a wireless remote control device 500 for interacting with the video presentation software is shown in FIG. 9. The wireless remote control device includes a plurality of a control buttons for controlling the manner in which digital video is presented. The control buttons may include for example play 502, cut to different angle 504 fast forward 506; reverse 508; slow motion 510; rewind 512; skip to next video segment 514; skip to previous segment 516; full screen display 518; and a laser pointer 520 so that the coach or other speaker may point to significant events occurring on the screen. The wireless remote control device 500 may interact with the computer running the video display software and presenting the video content via an infra red link, a Bluetooth wireless link, or some other wireless protocol. Alternatively, a remote control device may be wired to the computer via a USB connection or the like. The remote control device 500 interacting with the video presentation software allows a coach or other speaker to access video segments from a plurality of video streams and control the manner in which the video segments are presented. For example, a football coach may call up video segment recording a key play from a previous game. The coach may first run the video segment in its entirety to show the entire play. The coach may then skip back to the beginning of the segment and play the segment in slow motion in order to point out various factors that caused the play to be successful (or unsuccessful, whatever the case may be.) The coach may then switch to a different angle, such as a tight angle video segment recording the same play in order to isolate on the performance of a particular player or group of players such as the offensive line. The coach may play the segment several times in order to emphasize a point. When the coach has exhausted his supply of comments on the play he may then skip forward to the next play and continue, lecturing his players until he has said all he has to say.

Thus, according to the various embodiments of the invention, a Digital Video Editing System provides multiple tools for creating and presenting customized video presentations or programs, the Digital video editing system provides an automatic function for synchronizing video segments recorded by separate video capture devices and aligning or matching video segments that capture the same event from different perspectives. Furthermore, the Digital video editing system allows an editor to add playback controls and an audio overlay to a customized video program including a plurality of preselected video segments. Finally, play back controls allow a coach or other speaker to control the manner in which video segments are presented "on-the-fly" during the course of a live presentation.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A system for editing video relating to a sporting event, the system comprising:

a video storage device for receiving and storing a first plurality of video segments and a second plurality of video segments, the first plurality and the second plurality of video segments comprising video of one or more sporting plays of the sporting event, the first plurality of video segments captured by a first video source having a first view of the one or more sporting plays, the second plurality of video segments having a second view of the one or more sporting plays, wherein each video segment of the first plurality and the second plurality of video segments include a time stamp value;

a controller communicatively coupled to the video storage device, the controller configured for entering video playback commands associated with the first plurality and the second plurality of video segments;

a video playback device communicatively coupled to the video storage device and the controller, the video playback device configured to selectively play video segments of the first plurality and the second plurality of video segments stored in the video storage device according to video playback commands entered at the controller, the video playback device configured to determine a common reference time frame when a first video frame from the first plurality of video segments matches a second video frame from the second plurality of video segments;

a voice recorder communicatively coupled to the video playback device, the voice recorder configured to receive an accompanying voice overlay;

a video and audio assembler for assembling a video stream and the accompanying voice overlay, wherein the video stream comprises one or more video segments of the first plurality and the second plurality of video segments selectively played by the video playback device according to commands entered at the controller, and the accompanying voice overlay comprises a voice signal recorded by the voice recorder as the video segments are selectively played according to the video playback commands entered at the controller; and a video processor communicatively coupled to the video storage device;

a memory communicatively coupled to the video processor, the memory having computer-executable instructions stored thereon, wherein the computer executable instructions are configured to:

cause the video processor to receive a reference video frame included in the first plurality of video segments, the reference video frame having a reference time stamp value associated with a momentary action point within the sporting event;

cause the video processor to receive a second video frame included in the second plurality of video segments, the second video frame comprising the same momentary action point as the reference video frame, the second video frame having a momentary action point time value stamp value associated with the momentary action point;

cause the video processor to determine a time correction factor, the time correction factor comprising a time difference between the reference time stamp value of the reference video frame and the momentary action point time value stamp value of the second video frame; and cause the video processor to synchronize each video segment of the second plurality of video segments with each video segment of the first plurality of video segments based upon the time correction factor;

wherein the video playback device is adapted to display an interface page, the interface page adapted to display the video stream, the interface page having a matrix of columns and rows, wherein each row corresponds to a separate play of the sporting event and each column corresponds to a separate view of the respective play in the corresponding row.

2. The system as recited in claim 1, wherein the voice overlay comprises audio commentary associated with the one or more video segments.

3. The system as recited in claim 1, wherein each time stamp value comprises a start time and a stop time, the start time corresponding to at least one of a first video start time the first video source initiated recording a first source video segment of the first plurality of video segments or a second video start time the second video source initiated recording a second video source video segment of the second plurality of video segments, the stop time corresponding to at least one of a first video stop time the first video source ceased recording the first source video segment or a second video stop time the second video source ceased recording the second video source video segment.

4. The system as recited in claim 1, wherein the time stamp value is associated with at least one of an internal clock of the first video source or an internal clock of the second video source.

5. The system as recited in claim 1, wherein the video storage device comprises at least one of an internal hard drive, an external hard drive, or a flash memory device.

6. The system as recited in claim 1, wherein the interface page comprises a graphical user interface.

7. The system as recited in claim 1, wherein the interface page is adapted to display a video editor, the video editor adapted to display a preview of at least one of the first plurality of video segments or the second plurality of video segments.

8. The system as recited in claim 1, wherein the controller comprises a wireless remote control device.

* * * * *